United States Patent Office 3,490,821
Patented Jan. 20, 1970

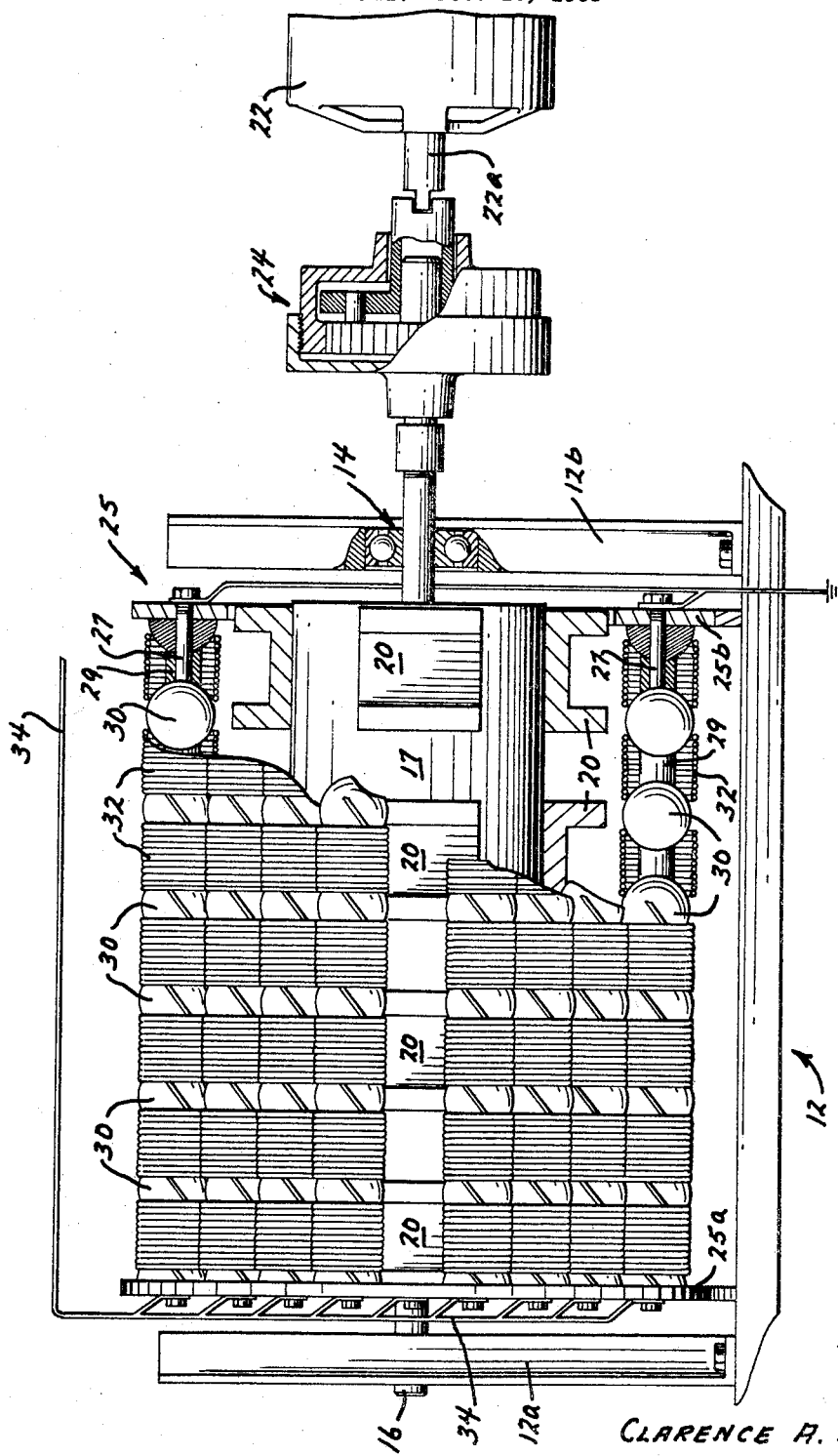

3,490,821
DEVICE FOR PRODUCING ELECTRICAL ENERGY
Clarence A. Schmidt, R.R. 2, Mount Carmel, Ill. 62863
Continuation-in-part of application Ser. No. 698,851, Jan. 18, 1968. This application Dec. 16, 1968, Ser. No. 783,958
Int. Cl. H02k 21/12
U.S. Cl. 310—156                                4 Claims

ABSTRACT OF THE DISCLOSURE

A device for producing electrical energy which includes a rotatable cylinder having a plurality of permanent magnets mounted thereon. A stationary field winding arrangement encloses said cylinder. Said field winding includes a plurality of parallel positioned supporting members—enclosed by continuous coil windings and being mounted on the end plates—for supporting a plurality of electrically conductive spheres.

---

The present application is a continuation-in-part of pending United States patent application Ser. No. 698,851, now abandoned, filed Jan. 18, 1968, and having the same title.

As is known, it is desirable to achieve the production of electricity through a simple yet effective approach. The invention provides such an arrangement, being based on an inductive relationship between rotating permanent magnets and a stationary field winding. The aforesaid stationary field winding is defined by a series of supporting members or rods, generally parallel with respect to each other, and carrying electrically conductive spheres therealong. The winding progresses, from ground potential, along each of the aforesaid supporting rods, in series, and fills spaces between the electrically conductive spheres.

Such coil windings feed into an output line which provides electrical energy for driving any desired equipment. In order to initiate the production of such electrical energy, a drive motor is employed, where a gear multiplication arrangement is provided for driving the rotating permanent magnets faster than the drive motor.

The invention is representative of a minimum of components, readily assembled for use, and susceptible to design variations to accommodate different end usage requirements.

A better understanding of the present invention will become more apparent from the following description, taken in conjunction with the accompanying drawing, being a view in front elevation, partly fragmentary and partly in cross section, showing the device.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to the figures, the invention is shown mounted on framework 12 having upstanding end support members 12a and 12b. As evident from the figure, and while only one is shown, a conventional bearing assembly 14 is provided in each end support member for receiving a rotatable shaft 16 which carries a cylinder 17. In this latter connection, a plurality of permanent magnets 20 are secured to the cylinder 17, where, in the embodiment shown, four rows are employed, the center line of each being spaced 90° from the next adjacent magnets. The adjacent portions of the permanent magnets 20 are of the same polarity and, in a preferred form of the invention, a thirty pound magnet is employed.

The rotating magnet carrying cylinder, including the shaft 16, connects to a belt initiated magnet drive motor 22, typically of low r.p.m., having a power shaft 22a. A known type of gear multiplication arrangement 24, typically sun gears, is disposed between the power shaft 22a and the shaft 16, and serves, in the invention form being described herein, as a three-to-one multiplication of rotation of the power shaft 22a of the drive motor 22. In other words, the magnet carrying cylinder will rotate at a speed three times of that of the drive shaft 22a of the drive motor 22.

A stationary framework 25 is disposed within the space defined by end support members 12a and 12b of the framework 12, and includes framework mounted end plates 25a and 25b. A series of generally parallel supporting members or shafts 27 extend between and are mounted on the end plates 25a and 25b. As should be evident from the drawing, each supporting shaft 27 has a series of electrically conductive spheres 30 mounted thereon, with spacers 29 being disposed between each. In other words, the spheres 30 each have an opening through which the supporting shafts 27 pass.

A continuous coil winding 32 is wound along each row of spheres 30, filling the spaces between the spheres 30, where one end of such coil winding 32 goes to ground and the other end passes, in the drawing, from right to left. The ends of the coil winding 32 on each row defined by the supporting shafts 27 go to a common conductor 34, which serves as an output line to the to-be-powered equipment (not shown).

In use, the drive motor 22 is started, resulting in the rotation of the power shaft 22a thereof, and the magnet carrying cylinder is rotated through the aforesaid multiplication arrangement 24. The rotation of the permanent magnets 20 induces an alternating voltage into the stationary field windings, causing electrical energy to pass through the output line 34 to the equipment to be powered.

It should be understood that the use of more fields, i.e., more rows of electrically conductive spheres, increases the power output. The invention simply and effectively provides desired electrical energy. Obviously, the stationary field winding is readily assembled, as is the rotating magnet carrying cylinder. The invention provides desirable end results and, of course, may be modified for larger or smaller power requirements, or multi-units may be employed. Thus, the above description should be considered illustrative and not as limiting the scope of the following claims:

I claim:
1. A device for producing electrical energy comprising a framework, a permanent magnet carrying cylinder rotatably mounted on said framework, a stationary field winding surrounding said rotatable permanent magnet carrying cylinder, and drive means rotating said permanent magnet carrying cylinder, said stationary field winding being defined by end plates having a series of parallel supporting members extending therebetween, and a row of electrically conductive spheres mounted on each of said supporting members, each row of electrically conductive spheres having a continuous winding therealong.

2. The device of claim 1 where said drive means is a motor.

3. The device of claim 1, where spacers separate said electrically conductive spheres.

4. The device of claim 1 where said continuous winding fills the spaces between adjacent electrically conductive spheres.

References Cited

UNITED STATES PATENTS

| | | | |
|---|---|---|---|
| 2,597,207 | 5/1952 | Underwood | 310—113 |
| 3,157,810 | 11/1964 | Adkins | 310—258 |
| 3,184,628 | 5/1965 | Hammerstrom | 310—168 |
| 3,286,110 | 11/1966 | Pintar | 310—156 |
| 3,405,297 | 10/1968 | Madsen | 310—258 |

MILTON O. HIRSHFIELD, Primary Examiner

R. SKUDY, Assistant Examiner

U.S. Cl. X.R.

310—166, 168